United States Patent [19]
Bied-Charreton et al.

[11] Patent Number: 5,467,365
[45] Date of Patent: Nov. 14, 1995

[54] PROCESS FOR THE RECOVERY OF LEAD ARISING ESPECIALLY FROM THE ACTIVE MATERIAL OF SPENT BATTERIES, AND ELECTRIC FURNACE INTENDED ESPECIALLY FOR THE USE OF THE PROCESS

[75] Inventors: Benoît Bied-Charreton, Villefranche sur Saone; Pierre Chabry, Maurepas; Jacques Lecadet, Paris; Patrice Pasquier, Chantilly, all of France

[73] Assignee: Metaleurop S.A., France

[21] Appl. No.: 119,410

[22] Filed: Sep. 9, 1993

[30] Foreign Application Priority Data

Sep. 11, 1992 [FR] France .................. 92 10849

[51] Int. Cl.⁶ ........................... F27D 17/00
[52] U.S. Cl. .................. 373/9; 373/2; 373/109; 75/10.59; 75/696
[58] Field of Search .............. 373/8, 9, 2, 42, 373/79, 81–84, 109; 75/10.29, 10.53, 693, 696, 715, 77, 10.59; 134/7; 204/114, 117; 266/144

[56] References Cited

U.S. PATENT DOCUMENTS

| | | | |
|---|---|---|---|
| 4,030,916 | 6/1977 | Liniger | 75/77 |
| 4,135,912 | 1/1979 | Matthew et al. | 75/10 R |
| 4,168,155 | 9/1979 | Cusanelli et al. | 75/77 |
| 4,402,491 | 9/1983 | Bergsoe | 266/144 |
| 4,571,261 | 2/1986 | Buren et al. | 75/77 |

FOREIGN PATENT DOCUMENTS

| | | |
|---|---|---|
| 0196800 | 7/1990 | European Pat. Off. . |
| 2297254 | 1/1976 | France . |
| 2342345 | 9/1977 | France . |
| 2414558 | 8/1979 | France . |
| 2600384 | 7/1976 | Germany . |

OTHER PUBLICATIONS

L. M. Fontainas and R. H. Maes, Metallurgie Hoboken–Overpelt Research Department, 2710 Hoboken, Belgium, "A Two-Step Process For Smelting Complex Pb–Cu–Zn Materials," Feb. 24–28, 1980, pp. 375–393.

R. Maes, Metallurgie Hoboken–Overpelt Research Department, 2710 Hoboken, Belgium, "Two–Step Smelting Of Complex Lead–Containing Materials," Metallurgie XXII-4-1982, pp. 211–216.

*Primary Examiner*—Tu Hoang
*Attorney, Agent, or Firm*—Blakely, Sokoloff, Taylor & Zafman

[57] ABSTRACT

An electric furnace (containing an immersed electrode) and a process for the recovery of lead, arising especially from solid residues. Fines, which are a product of physically crushing spent batteries, are melted under not very reducing conditions in the presence of a small amount of carbon. This melting allows separating the crude lead and the lead-rich slag so as to remove sulphur in the form of sulphur dioxide and to optionally recover the crude lead. The lead-rich slag is then reduced with a suitable amount of carbon so as to separate the lead-free slag and the crude lead, which again can recovered.

8 Claims, 1 Drawing Sheet

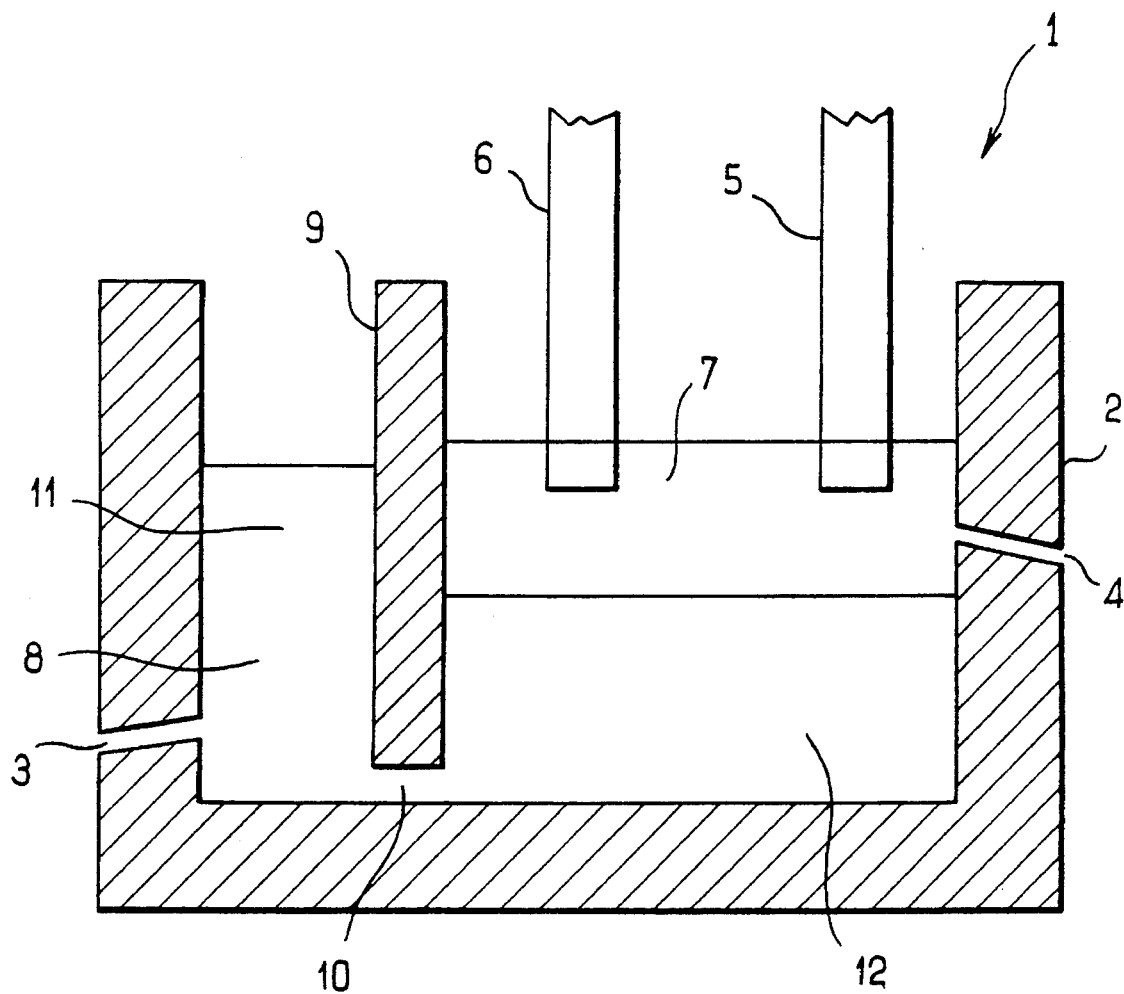

PROCESS FOR THE RECOVERY OF LEAD ARISING ESPECIALLY FROM THE ACTIVE MATERIAL OF SPENT BATTERIES, AND ELECTRIC FURNACE INTENDED ESPECIALLY FOR THE USE OF THE PROCESS

BACKGROUND OF THE INVENTION

1. Field of the Invention

The invention relates to a process for the recovery of lead, arising especially from the active material of spent batteries. It also relates to an electric furnace intended especially for the use of the process.

2. Art Background

Henceforth, the main industrially significant application of lead lies in its use as a material for forming batteries.

Moreover, as a result of the importance of the market for batteries, it is estimated that approximately 50% of lead production arises from the recycling of this metal present in batteries.

Generally, the spent battery consists of lead (weakly alloyed metal, in the sulphate or oxide form), plastics and sulphuric acid, the major impurity being sulphur.

The process which requires the least handling consists in charging the batteries as such into a blast furnace identical to those used for first melting and in recovering the sulphur either in the gas form ($SO_2$), but unfortunately in the very dilute form, or, by modifying the reduction setting of the furnace, in a ferrous matte, which has many disadvantages regarding its possible storage in waste tips.

All the other processes require a prior physical grading beginning with crushing batteries in the presence of water, which makes it possible to separate the metallic lead (battery lead connections and accumulator plates), plastic and fines. The fines, for their part, are 70 to 80% composed of lead, of which especially approximately half is found in the sulphate form due to the spent nature of the battery, the remainder of this lead is mainly found in the oxide state and optionally, for a small proportion, in the metallic state. The other components of the fines, apart from lead and sulphur, are plastic particles arising from the shortcomings of the separation means, as well as a small amount of silica.

To the knowledge of the Applicant, a number of recovery processes are currently used starting from battery fines as obtained as indicated above.

A first process consists of trapping the sulphur in a sodium slag (by addition of sodium and iron). This slag, which has a low melting point (850°–950° C.), can be easily removed and the use of a simple rotary furnace is sufficient. Nevertheless, the sodium slag is relatively unstable which makes it difficult to store it on a long term basis in a waste tip.

A second process consists in lixiviating the battery fines with a sodium carbonate solution in order to separate quantitatively the lead carbonate from the sodium sulphate solution which is discarded. The lead carbonate is then treated in a suitable unit. Discarding or enhancing the value of the sodium sulphate is, however, difficult.

A third process consists in melting the fines in a reverberatory furnace in an oxidizing medium produce crude lead and a lead-rich slag (PbO) and in then reducing the said slag in an electric furnace.

Nevertheless, the $SO_2$ produced during the first stage is very dilute and expensive to trap or to recover.

Other documents describe a process involving an electric reduction furnace.

Document FR-A-2,414,558 describes a process for extracting nonferrous metals contained in slags and other metallurgical by-products containing nonferrous metals in the form of compounds, in which these materials are processed in the molten state by heating them by resistance in an electric furnace containing immersed electrodes, under a layer of solid reducing agent, and by injecting a non-oxidizing gas into the molten material so as to produce efficient mixing of the said material, characterized in that the non-oxidizing gas is injected at a flow rate between 0.5 and 10 $Nm^3$/hour/tonne of material treated.

This process thus requires the prior production of the slags, having a low sulphur content, in another furnace and involves mixing by injection of gas.

Document FR-A-2,297,254 proposes a reduction, in one stage in an induction furnace, of a lead slurry, after having removed water therefrom, by mixing with anhydrous pulverulent carbon so as to cause dissociation of the lead compounds (lead peroxide $PbO_2$, lead sulphate $PbSO_4$) and then to extract the sulphur dioxide from the reaction gases. It is shown, page 3, that the amount of coke added represents from 2 to 9% with respect to the dried product; such a range of control will correspond to very different degrees of reduction and to very different levels of removal of the sulphur; this process, which consists of only a single stage, has the disadvantage of not being able to produce simultaneously a slag having a low lead content and a good yield of removal of the sulphur.

It is shown, in the description on page 2, lines 5 to 10, that this process makes it possible to increase by several times the relative $SO_2$ content of the gases with respect to the known processes, this factor making it possible not only to remove dust from the gas in a simple way at the furnace outlet but, moreover, making it possible to separate easily the $SO_2$ therefrom.

It is, in effect, a major objective of any process intended for reprocessing battery fines and for recovering the lead from the latter. To the knowledge of the Applicant, this process cannot be used industrially for processing the products shown while both removing the sulphur and producing a slag which is impoverished in lead.

Document U.S. Pat. No. 4,571,261 also proposes a single-stage reduction of a lead slurry by heating with a burner and vigorous stirring and corresponding evolution of sulphur dioxide.

Likewise with such a process, it is not possible to obtain simultaneously a slag having a low lead content and a good yield for removal of sulphur.

Document FR-A-2,342,345 describes a process for processing lead residues in the non-dissolved state, produced during the production of electrolytic zinc. The lead is largely in the sulphate form and is present in the residues in a proportion varying from 10 to 60%. The said process comprises the direct, simultaneous and essentially continuous addition to an electric furnace containing partially immersed electrodes a) of the lead residues, b) of a reducing agent containing carbon, c) of fluxes for producing a slag containing FeO, CaO and $SiO_2$; and maintaining the temperature of the layer of molten slag in the electric furnace within the range from 1000°–1500° C. to produce at least two separate layers of the molten phase in the said furnace, one of the said layers being a slag layer and the other of the said layers being an crude lead layer; and the recovery from this furnace of a crude lead containing less than 1.1% of sulphur and of a slag containing not more than 4% of lead.

This process nevertheless has the following disadvantages in the case of the recovery of lead from battery fines:

The reduction setting shown, which corresponds to an oxygen potential equivalent to 4% of lead in the slag, does not make it possible in the case of battery fines to sufficiently remove sulphur in the gases, in the form of $SO_2$, and consequently leads to the preservation of a significant amount, indeed of all, of the sulphur in the molten products in the form of a matte which is difficult to separate from the slag or, in all cases, difficult to reprocess or to store.

SUMMARY OF THE INVENTION

The aim of the invention is to overcome the disadvantages described above by volatilizing virtually all the sulphur in the gases, in the form of $SO_2$, in a first stage. Moreover, it has the aim:

of producing this $SO_2$ gas in a concentrated form in order to facilitate its recovery therefrom, of producing a stable slag which can be stored anywhere while respecting the environment or even reemployed for construction uses in civil engineering or building, of significantly reducing the amounts of dust produced either by volatilization of the lead and of its compounds or by escapes during charging of the fines.

Other advantages of the present invention will become apparent in the course of the description which will follow.

According to the invention, the process successively comprises, in an electric furnace containing immersed electrodes, the following stages:

a) melting the fines, especially from spent batteries, under not very reducing conditions in the presence of a small amount of carbon so as to separate the crude lead, on the one hand, and a lead-rich slag, on the other hand, so as to remove the sulphur in the form of sulphur dioxide and, optionally, recovery of the crude lead, b) reduction of the lead-rich slag with a suitable amount of carbon so as to separate, on the one hand, a reduced substantially, lead-free slag and the crude lead;

c) recovery of the crude lead from Stages b) and optionally a).

The process of the present invention is suitably carried out in an electric furnace containing submerged electrodes. This furnace is well known to one skilled in the art and operates by passing the electric current through the slag phase (resistance heating). The graphite electrodes of the furnace are partially immersed in the slag phase. This furnace can comprise one or a number of electrodes depending on the circumstances.

Advantageously, the sulphur is removed by the evolution of a gaseous mixture consisting of carbon dioxide and of a high proportion of sulphur dioxide.

Advantageously, Stage a) makes it possible to provide for the removal of virtually all the sulphur in the form of $SO_2$ concentrated to contents of 20 to 40% in the dry gases, after extraction from the feed and before possible dilution due to little parasite inlets, as a mixture with the $CO_2$ arising from the reaction of the oxides with the carbon.

The temperature of the material inside the furnace is generally between 700° and 1500° C. The temperature of the furnace is adapted, by modification of the electrical power, to the melting point of the slag phase which is found inside. Thus, the first stage will generally be carried out with a temperature of between 600° and 1100° C. (preferably 700°–1100° C.), although a higher temperature can be envisaged even though scarcely necessary.

The temperature of the furnace during the second stage is generally between 900° and 1500° C. It is possible to meet the increase in the melting point of the slag caused by its impoverishment in lead and to reach slags having high melting points, and thus more stable with respect to the environment than those which can be melted in oil— or gas-fired stationary or rotary furnaces and where the maximum temperatures are limited.

Although the process according to the invention is particularly suited to the recovery of the lead contained in battery fines, it makes it possible to generally process complex mixtures of metals comprising oxides and sulphates. This process relates both to the processing of materials having high metal contents and to products in which the metals are in low amounts.

By way of indication, the process is suited to the processing of residues and by-products from the metallurgy of nonferrous metals such as:

the by-products based on lead sulphate resulting from the industries for the manufacture of lead accumulators, the residues from factories for the electrolysis of zinc containing lead, zinc, iron and other metals, as well as sulphur in the form of sulphate, dust resulting from factories for the incineration of household waste.

In the field of recycling, it mainly concerns the recycling of products resulting from the recovery and breaking of lead accumulators as has been mentioned in the account of the prior art.

It will be recalled that it mainly concerns fine products resulting from the breaking and metallic products also resulting from battery breaking or from the recovery of "old leads".

According to a variant of the process according to the present invention, a moist material is processed which has the following composition in solid residues (in percentage by weight):

| | |
|---|---|
| lead | 10 to 95% |
| sulphur (mainly in the sulphate form) | 1 to 12% |
| carbon | 0 to 10% |
| materials which can form slag such as silica (in the form of $SiO_2$) or lime | 0 to 80% | the remaining percentage consisting of the oxygen of the oxides, as well as of other metals such as antimony, tin, arsenic and the like, and elements present, other than carbon, in the organic compounds (chlorine).

The process according to the invention is particularly suited to the processing of the fines containing a high lead content (greater than 60%); especially The battery fines. Generally those battery fines contain about more than 40% of $PbSO_4$.

According to a variant of the present invention, these battery fines will have the following composition by weight:

| | |
|---|---|
| lead | 60 to 90%, |
| sulphur | 2 to 8%, |
| carbon | 0 to 4%, | the remaining percentage consisting of oxygen, other metals such as antimony, elements present in the organic compounds and materials which can form slag.

From the fact that the lead residues, such as the battery fines, are generally separated from the processing liquors by conventional processes, it ensues therefrom that a certain amount of water remains present in the material to be processed. It is advisable to dry these lead residues until they have a moisture content of less than 10%, and even better less than 5%, and preferably of the order of 2 to 3% before charging to the electric furnace. This makes it possible into remove the potential risks of explosion and of foaming which could be produced as a result of the evolution of excessive amounts of steam. Nevertheless, care will be taken to maintain a certain moisture content in order to prevent escape of dust during charging. Also, the invention makes it possible to charge the products without preparation other than the predrying indicated above or by including in this drying process shaping operations by hot or cold pressing or by nodulization in the presence of water or of slurry.

Suitable sources of the reducing agent containing carbon are advantageously chosen from coke, oil coke, coke dust (that is to say finely subdivided coke), graphite, carbon black, wood charcoal, anthracite or coals in general.

Melting under not very reducing conditions means melting of fines in which the amount of carbon added or already present in the material to be processed is such that the oxygen to carbon atomic ratio of the gas produced by this reduction is bigger than 1, preferably greater than 1.5 and advantageously greater than 1.95.

On a practical level, the amount of reducing agent containing the carbon used in the first stage of the process according to the present invention is adjusted in order to obtain a slag in which the lead content is from 10 to 60% and preferably from 35 to 50%; for battery fines containing 60 to 90% of lead in the form of sulphates or oxides, this carbon content, including the carbon arising from the organic materials contained in the fines, is between 2 and 4%, approximately 3%. During this stage under not very reducing conditions, this type of adjusting and the oxygen thermodynamic potential thus obtained in the slag, which is linked to the activity of the lead oxide in the said slag, makes it possible to oxidize the sulphur present in the form of $SO_2$.

Thus, the process of the present invention introduces a new and elegant method for the processing of lead residues, making possible the evolution of the sulphur dioxide in a concentration such that a subsequent recovery is possible at the lowest cost. For example, the $SO_2$ can be neutralized and be used for the manufacture of gypsum, or can be directed into a unit for the manufacture of sulphuric acid.

At the same time as the evolution of the gaseous mixture, a phase separation is observed between an upper slag phase and a lower crude lead phase comprising less than 2% of sulphur and preferably less than 1%.

While supplying the furnace with battery fines, a significant part of the lead is thus simultaneously recovered in the metal form and a lead-rich slag layer is progressively formed. When the latter reaches a significant thickness, introduction of material is halted and replaced by addition of carbon distributed on the surface of the molten bath, which makes it possible to form a floating bed on the slag bath, in order to carry out the reduction stage of the slag which precedes its pouring and to separate the lead therefrom in the form of a crude lead.

The amount of carbon added for this reduction stage depends on the amount of lead oxide which it is desired to reduce, as well as on the duration of these reactions, and thus it is advantageous to add from 5 to 30% by weight of carbon with respect to the amount of lead oxide present in the furnace. The carbon source used can be similar to that described during the first stage with preferably a bigger particle size corresponding to particles of 3 to 15 mm.

The slag obtained at the end of this second stage has a lead content which can be easily lowered below 1%, and even 0.3%, which allows storage or applications without risk to the environment.

During the first stage, fluxes are added to the fines in order to obtain the desired slag composition, the fluctuations in the amounts of materials which can form slag introduced by the fines, mainly silica, being corrected. The targeted slag composition is chosen in order to obtain a fluidity which makes possible suitable mass transfer and reaction rates, an electrical conductivity sufficient for passing the current, and a minimum corrosive ability with respect to the refractory materials.

Preferably, the flux will be based on a mixture of iron oxide, lime and optionally silica, even though this component is already present in the case of battery fines.

The process can be carried out continuously by alternating, in the same furnace, the phases of charging raw materials under not very reducing conditions, and of pouring the crude lead thus obtained, with phases without supplying with fines where the reduction of the slag is carried out by replacing the supplying of materials with a reducing agent at the end of these periods, and the impoverished slag is poured leaving only the minimum thickness for dissipation of the electrical power.

Another subject of the present invention is an electric furnace containing immersed electrodes which makes it possible to use the process according to the present invention as it has just been described above.

The device according to the invention consists of a tank containing one or a number of electrodes at a depth such that it is immersed in the slag phase during the process, one or a number of means for discharging the slag phase, one or a number of means for discharging the crude lead and means for introducing the various constituents which make it possible to use the process.

According to an advantageous variant which makes it possible to facilitate recovery of the crude lead, the tank comprises a siphon region optionally containing the current return.

BRIEF DESCRIPTION OF THE DRAWING

FIG. 1 is a schematic sectional drawing of one embodiment of an electric furnace of the present invention.

DETAILED DESCRIPTION OF THE INVENTION

The invention will now be described in connection with a description of specific embodimental examples and of a diagram of an implementational device.

The single figure represents a schematic sectional drawing of an electric furnace according to the invention.

The electric furnace 1 comprises a tank 2 equipped close to its base with an orifice 3 for discharging the crude lead 8 and at mid-height, diametrically opposite, an orifice 4 for discharging the slag phase 7.

An internal wall 9 leaving a passage 10 at the bottom of the tank delimits a siphon region 11 where the orifice 3 is situated and a melting region 12 where the orifice 4 is situated.

Two electrodes 5 and 6 in the melting region 12 are immersed in this tank up to mid-height so as to be in contact over a sufficient thickness with the slag phase. Discharging of the gases is carried out via a suitable pipe.

According to an unshown variant, an electrode 5 can be placed in the siphon region as current return.

EXAMPLE 1

Description of a Type of Oxidizing Operation

Per liter of materials charged for which the composition is:

|     |       |
| --- | ----- |
| Pb  | 70.9% |
| S   | 5.4%  |
| Sb  | 0.5%  |
| Fe  | 0.6%  |
| $SiO_2$ | 1.1% |
| CaO | 0.7%  |
| C   | 2%    |

The necessary additions for the use of the process are:

20 kg of FeO per one tonne of material 5 kg of $SiO_2$ per one tonne of material 10 kg of carbon per one tonne of material.

Under these conditions, the furnace produces the following flows per one tonne of starting materials:

| crude lead | 625 kg containing 0.6% of sulphur |
| --- | --- |
| gases | 100 $Nm^3$ (64% of $CO_2$ and 36% of $SO_2$) |
| dust | 50 kg containing 70% of lead and 9.6% of sulphur. |

The oxidized slag which accumulates in the furnace represents 70 kg and is composed of:

FeO 23.0%

$SiO_2$ 18.7%

CaO 8.3%

PbO 50.0%

For a 0.5 $m^2$ furnace supplied at 100 kg/h, the power necessary is established at 50 kW, taking into account the heat losses via the secondary air inlets and the walls which represent 18 kW. The mean resistance between the electrode and the metal reaches, under these conditions, 8 mohm.

EXAMPLE 2

Oxidizing Stage

With the same materials and the same operating conditions as in Example 1, the change from a carbon addition of 10 kg/t to 25 kg/t makes it possible to reduce the lead content of the slag to 30%, which increases the sulphur content of the crude lead to 1.5% and requires a pouring temperature greater than 950° C.

EXAMPLE 3

Reducing Stage

From a bath of lead-rich molten slag resulting from the first oxidizing stage, reduction with addition of carbon to the surface of the bath takes place under the following conditions:

| amount of slag present | 650 kg |
| --- | --- |
| thickness of the slag layer | 25 cm |
| lead content of the slag before reduction | 30% |
| amount of carbon added | 28 kg |
| duration of the reduction | 8 h |
| final lead content | 0.41% |

What is claimed is:

1. Process for the recovery of lead, arising from solid residues, said process comprising, in an electric furnace containing immersed electrodes, the steps of:

a) melting the residues which have the following composition in solid residues, in percentage by weight:

| lead | 10 to 95% |
| --- | --- |
| sulphur | 1 to 12% |
| carbon | 0 to 4% |
| materials which form slag | 0 to 80% | the remaining percentage consisting of oxygen, and metals chosen among antimony, tin, arsenic and chlorine at a temperature between 600° C. and 1100° C. in the presence of a 2% to 4% carbon including the carbon arising from the organic materials contained in the residues, to separate the crude lead, on the one hand, and a lead-rich slag, on the other hand and, to remove the sulphur by evolution of a gaseous mixture consisting of carbon dioxide and 20% to 40% of sulphur dioxide and carbon dioxide and the amount of carbon added in the first stage is such that the slag has a lead content between 10% and 60% at the end of step a), b) reduction of the lead-rich slag with an amount of carbon which is between 5% and 30% by weight with respect to the amount of PbO formed during step a) and which is present in a lead-rich slag phase, at a temperature between 900° C. and 1500° C., to separate, a reduced substantially lead-free slag and the crude lead, c) recovery of the crude lead of obtained in step b).

2. Process for recovery of lead according to claim 1, wherein the crude lead separated during step a) is recovered.

3. Process according to claim 1, wherein the temperature during step a) is between 700° C. and 1100° C.

4. Process according to claim 1, wherein the carbon content present during step a) is approximately 3%.

5. Process according to claim 1, wherein the carbon arises from at least one of oil coke, coke dust, graphite, carbon black, wood charcoal, anthracite and coal.

6. Process for the recovery of lead according to claim 1, wherein an active material arising from spent batteries which have the following composition in percentage by weight:

| lead | 60 to 90% |
| --- | --- |
| sulphur | 2 to 8% |

| | -continued |
|---|---|
| carbon | 0 to 4% | the remaining percentage consisting of oxygen, and metals chosen among antimony, tin, arsenic and chlorine.

7. Process for the recovery of lead according to claim 1, wherein, during the step a), a flux containing iron oxide, calcium oxide is added.

8. Process for the recovery of lead according to claim 7, wherein, the flux contains silica.

* * * * *